United States Patent [19]

Glaser

[11] Patent Number: 5,033,324
[45] Date of Patent: Jul. 23, 1991

[54] GEAR-CHANGING CONSOLE

[75] Inventor: Reiner Glaser, Salem, Fed. Rep. of Germany

[73] Assignee: Zahnradfabrik Friedrichshafen AG, Friedrichshafen, Fed. Rep. of Germany

[21] Appl. No.: 438,424
[22] PCT Filed: May 18, 1988
[86] PCT No.: PCT/EP88/00423
§ 371 Date: Nov. 13, 1989
§ 102(e) Date: Nov. 13, 1989
[87] PCT Pub. No.: WO88/09451
PCT Pub. Date: Dec. 1, 1988

[30] Foreign Application Priority Data

May 27, 1987 [DE] Fed. Rep. of Germany ....... 3717936

[51] Int. Cl.⁵ .............................................. B60K 20/04
[52] U.S. Cl. .................................... 74/473 R; 74/335; 200/61.88
[58] Field of Search ............................ 74/335, 473 R; 200/61.88

[56] References Cited

U.S. PATENT DOCUMENTS 2,582,895  1/1952  Young ........................ 74/473 R X
3,268,680  8/1966  Anderson ..................... 200/61.88 X
4,183,424  1/1980  Rumyantsev et al. ....... 200/61.88 X

FOREIGN PATENT DOCUMENTS 0052794  2/1982  European Pat. Off. .
1951428  4/1971  Fed. Rep. of Germany .
3905769  9/1989  Fed. Rep. of Germany .

Primary Examiner—Allan D. Herrmann
Assistant Examiner—Julie Krolikowski
Attorney, Agent, or Firm—Herbert Dubno

[57] ABSTRACT

Gearshift console (2) with one gearshift lever (3) for shifting a gearbox (1) of group design, primarily for farm tractors, wherein the gears (G1 through G4) formed in the basic transmission (11) are shifted manually and mechanically in an H pattern and two drive gear groups (L, S) and one reverse group (R) are additionally shifted. To achieve this, gearshift lever (3) is provided with a shifting knob (4) which can be turned into three shifting positions and shifts the three groups of the gearbox (1) with power assist, and in a gear selected in the basic transmission (11), the shifting knob (4) is locked directly in the gearshift console (2). The group shifting is blocked in a simple manner via guide webs (22) arranged on the gate plate (21) by means of two pawls (33) in each direction of drive which can be rotated via said shifting knob (4).

10 Claims, 3 Drawing Sheets

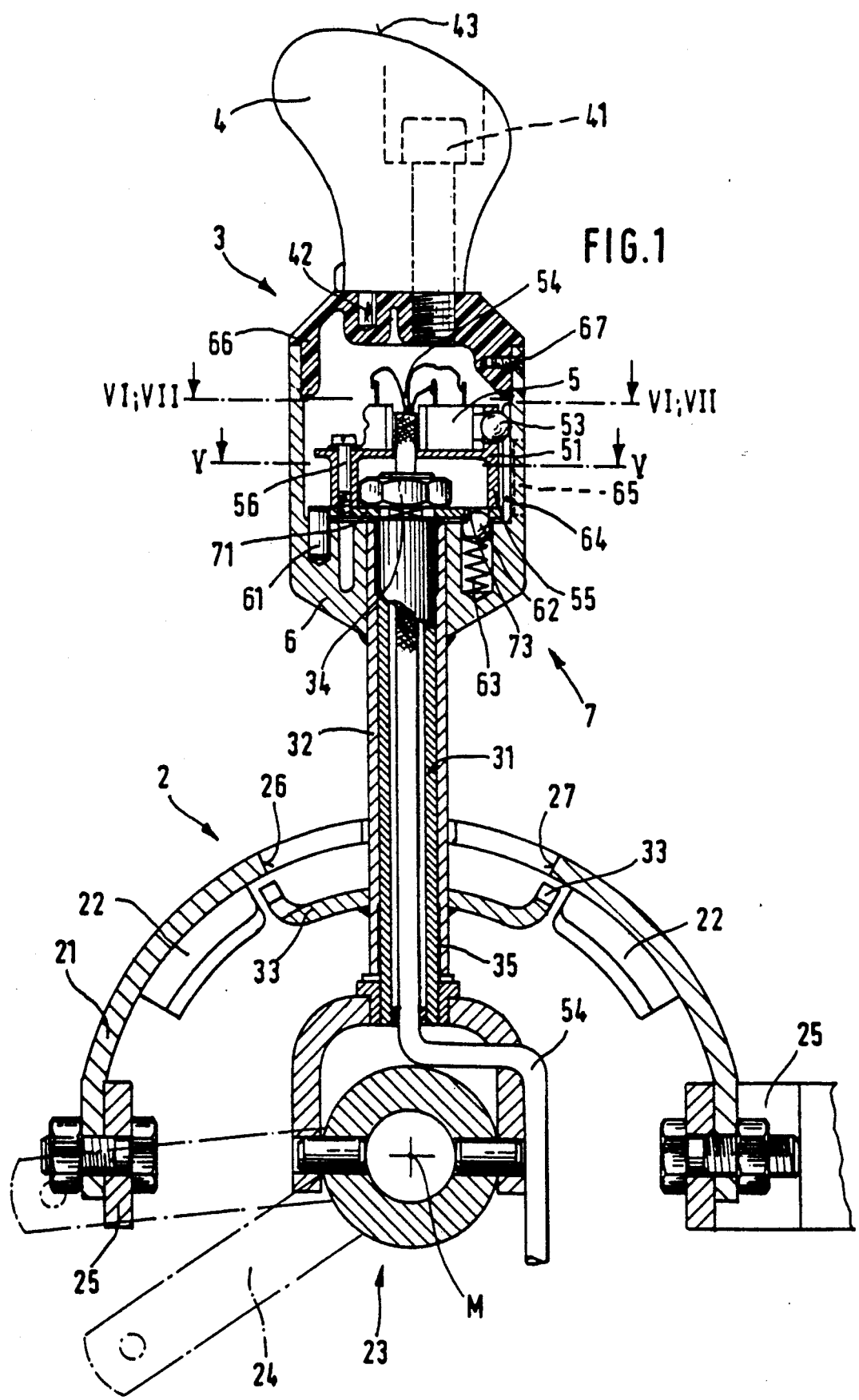

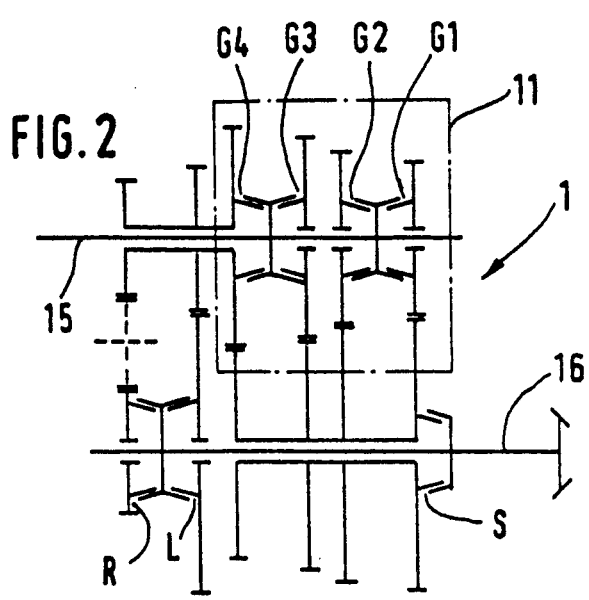
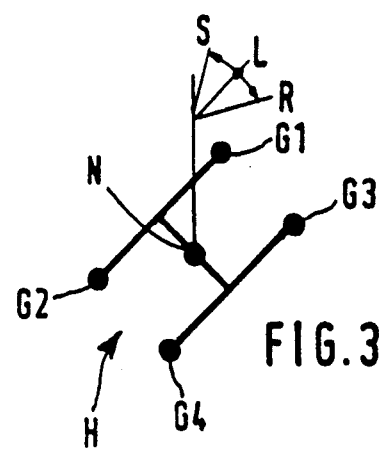
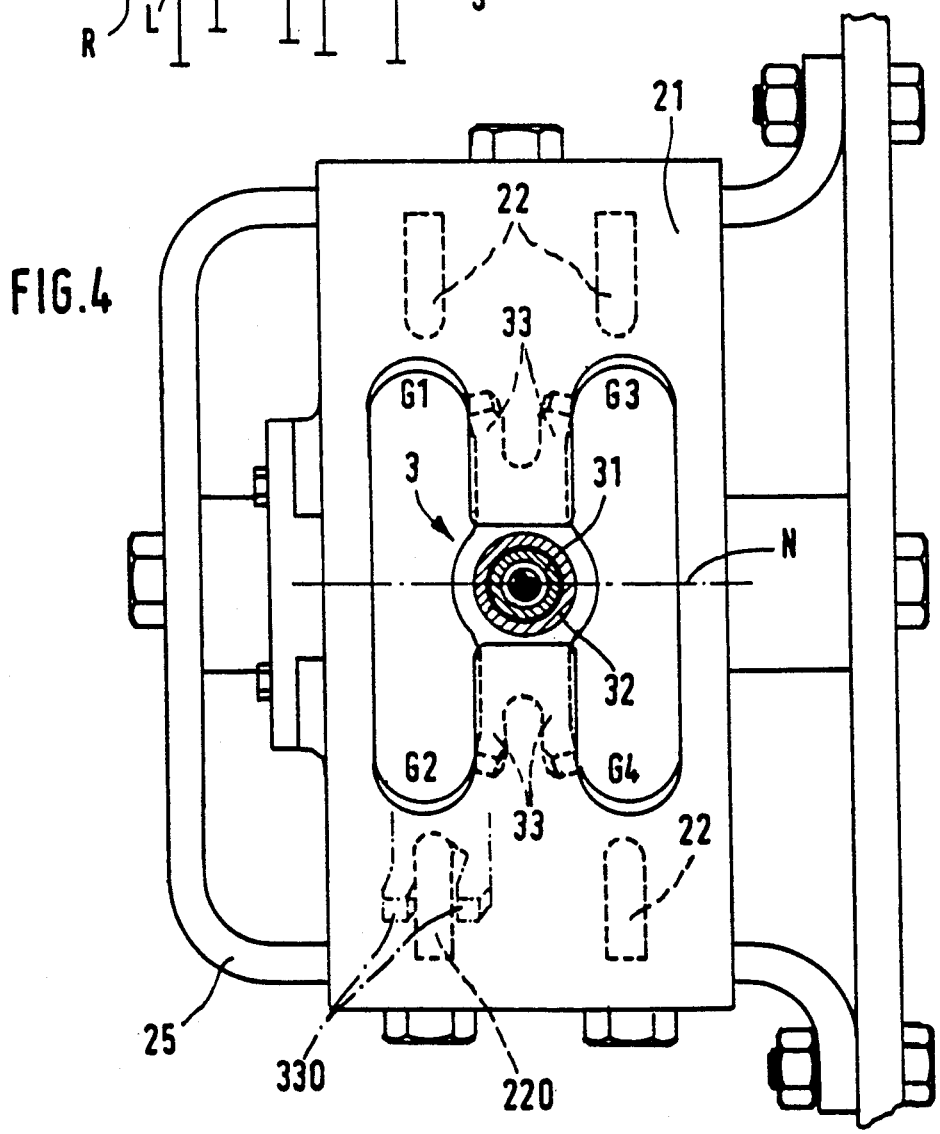

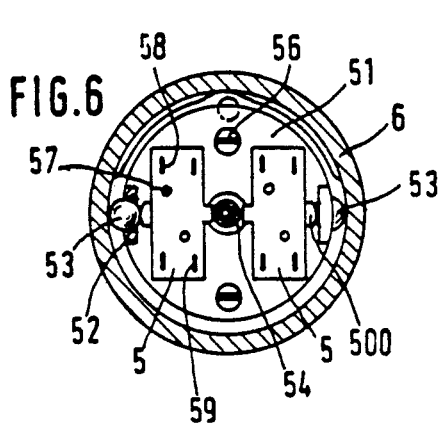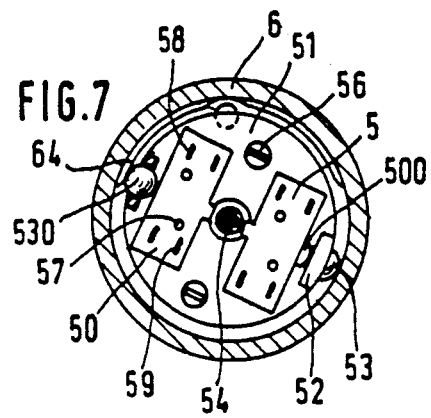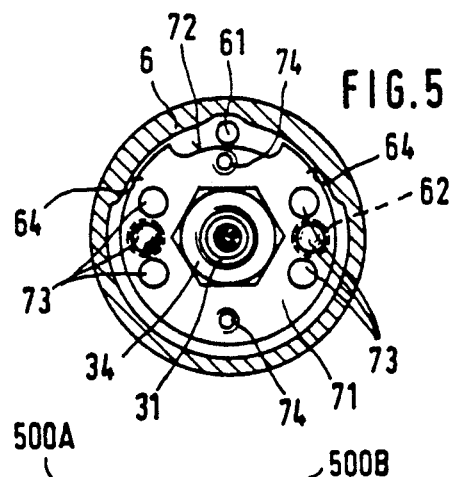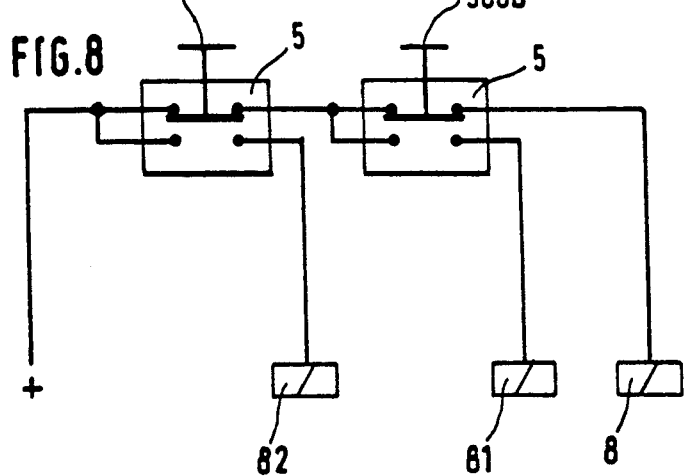

GEAR-CHANGING CONSOLE

FIELD OF THE INVENTION

The present invention pertains to a gearshift console with at least one gearshift lever for shifting a gearbox of group design.

BACKGROUND OF THE INVENTION

A gearshift console related to the present invention is known from EP 0 052 794. As is apparent from FIG. 3 of this document, four gears of the basic transmission are shifted with manual shift lever 20 from the gearbox manually and mechanically according to an H pattern. Furthermore, two drive gear groups and one reverse gear group are shifted via a second gearshift lever 40. Such devices, or, as shown in FIG. 1 and FIG. 2, with a gear splitting that can be shifted up or down under load, have proved to be successful in farm tractors. However, the mechanical two-lever shifting requires additional space in the driver's cab, and it generally does not any longer meet the requirements imposed on modern farm tractors.

It is therefore an object of the present invention to further develop a gearshift console which requires less space, is easier to operate, and with which shifting of the transmission groups is possible only in the neutral position of the manual gearshift lever for the basic transmission.

SUMMARY OF THE INVENTION

The combination of the shifting of the basic transmission according to an H pattern with the shifting of three auxiliary transmissions with only one gearshift lever leads to a considerable simplification for the driver, because he no longer has to reach from one gearshift lever to the other in many driving situations. The space requirement for the gearshift console in the driver's cab is also reduced. In addition, the power-assisted shifting of the groups facilitates the shifting of such a transmission with two drive groups and one reverse group, wherein the mechanical locking of the shifting knob in a gear selected in the basic transmission requires particularly little effort and no changes or manipulations in the transmission, as is demonstrated by the arrangement of the pawls on the outer tube of the gearshift lever and of the guide webs on the shifting gate plate. The arrangement of only two pawls to lock three positions in one shifting direction of two shifting paths is a particularly space-saving solution. The blocking means, arranged in parallel to the axis of the inner and outer tubes of the gearshift lever, with the swiveling movement limiting means arranged in the same plane, functions well, despite requiring little space, and can be manufactured and mounted in a simple manner.

In conjunction with the pawls and guide webs, the means for limiting the rotary movement, which consists of a straight pin arranged in a housing and an opening in the locking disk, permits simple arrangement of the locking of the shifting of the groups while one gear has been selected in the basic transmission. In the two outer positions of the shifting knob, only rotation toward the middle position must be blocked by one appropriate pawl, since the outward rotation is generally blocked via the means limiting the rotary movement. The middle position of the shifting knob is blocked by both pawls, because the guide web arranged on the gate plate is located between them, and the shifting knob is prevented from rotating via both pawls, the outer tube, and the housing. Shifting three groups via only two microswitches in conjunction with only two cams is possible, because the group associated with the middle position of said shifting knob is shifted by the non-actuation of both microswitches. In each position of said shifting knob which it reaches by being turned out of the middle position, a microswitch will shift, in conjunction with a cam, the corresponding other group.

It is also particularly advantageous that the inner tube with the locking disk and the support plate, and consequently also the microswitch, are not rotated, so that the conductors leading to the microswitches in the inner tube are also immobile, and the swiveling movement of the inner tube does not represent a load for the conductors.

As a consequence of the fact that a housing and a cover are arranged between said shifting knob and the fixed connection between the inner tube, the blocking plate, the support plate, and the microswitches, the shifting of the groups is still fully functional after removal of said shifting knob and lever, because the rotary movements can be performed via the housing.

The actual position of the group can be indicated in a simple manner using an opening or a window in the housing and by placing markings on the shaft of the support plate.

The curved design of the gate plate with a defined radius around the joint to which the inner tube of the gearshift lever is fastened permits a favorable design, especially of the blocking mechanism.

Even though it is known from West German Patent Specification No. 19 46 496 and West German Patent Specification No. 20 40 195 that group shifting can be brought about with auxiliary power, only two groups are shifted via a pilot valve arranged in the gearshift lever, and group shifting is locked, while one speed in the basic transmission has been selected, via a device arranged on a rotating shaft in conjunction with a main shutoff valve for the medium providing the auxiliary power.

The present invention is not limited to the combination of the characteristics of the claims. Further sensible possibilities for combining claims and individual claimed characteristics will become apparent to the person skilled in the art from the stated goal.

BRIEF DESCRIPTION OF THE DRAWING

Further details, objects, features and advantages of the present invention will become more readily apparent from the following description, reference being made to the accompanying drawing in which:

FIG. 1 shows a side view and a sectional view of a gearshift console with a gearshift lever, FIG. 2 shows a schematic representation of the gearbox, FIG. 3 shows the shifting pattern for the four gears of the basic transmission and the three groups, FIG. 4 shows the sectional top view of the gearshift console with the gearshift lever, FIG. 5 shows a section along V—V from FIG. 1, FIG. 6 shows a section along VI/VII—VI/VII in the middle position of the shifting knob from FIG. 1, FIG. 7 shows a section VI/VII—VI/VII in a rotated position of the shifting knob from FIG. 1, FIG. 8 shows the electrical function of the microswitch solenoid valves, and FIG. 9 shows a table of the operation of the microswitch according to FIG. 8.

DETAILED DESCRIPTION

Gearshift console 2 with gearshift lever 3 according to FIG. 1 is arranged within the driver's reach in a driver's cab (not shown) via fastening means 25. Gate plate 21, which has a defined radius, is arranged around the center point M of joint 23, so that the pawls 33 are at approximately equally spaced locations at the gearshift lever 3 during a swiveling movement. Guide webs 22 are also provided on this gate plate for the pawls 33. Gearshift lever 3 consists of an inner tube 31 rigidly attached to the rod lever 24 in joint 23 and an outer tube 32 mounted rotatably on it via bearing bushes 35, as well as a housing 6, which is rigidly attached to the outer tube 32 cover 66, and shifting knob 4. A locking disk 71 of a blocking mechanism 7 is rigidly attached to inner tube 31 via a nut 34. The locking disk also has holes 73, with which balls 62 engage to bring about locking. These balls are arranged in housing 6 and are pressed by an appropriate pressure spring 63 against the smaller holes 73 of locking disk 71. Housing 6 also contains a straight pin 61, which limits the rotation of shifting knob 4 from a middle position in both directions in conjunction with an opening. A support plate 51 for receiving two microswitches 5, which are switched during a rotary movement of shifting knob 4 via cams 64 and balls 53 on rotation of the shifting knob, is also mounted via screws 56. It is also possible to use electronic circuit components, e.g., Hall sensors, instead of electromechanical switches, in which case permanent magnets are installed in the housing instead of the cams 64. Conductors 54 from said microswitches 5 are led out of the gearshift console via said inner tube 31 to the solenoid valves 8, 81, 82 shown in FIG. 8. Cover 66 is mounted detachably via bolts 67 spaced along the circumference, and shifting knob 4 is connected to the cover via rotation preventing means 42 and clamping bolt 41.

Function is fully guaranteed With cover 66 removed and can be checked by rotation on the housing 6.

The schematic representation of transmission 1 according to FIG. 2 shows the clutches for the gears G1 through G4, which are shifted in the known manner via a manual gearshift lever 3, in the zone of the basic transmission 11. The clutches actuated with power assist for the group shifting are designated by R, L, and S, and the drive shaft and the power take-off shaft are designated by reference numerals 15 and 16, respectively.

FIG. 3 shows the H shifting pattern with the shifting paths of the gears G1/G2 and G3/G4, which are marked in gate plate 21. From the neutral position, it is still possible to shift three groups of the transmission by rotating the shifting knob, e.g., a lower-speed group L with the middle position, a higher-speed group S, and a reverse group R with the two outer positions. This combined shifting pattern can also be marked on the top side of said shifting knob 43 according to FIG. 1 to better inform the driver. In addition, housing 6 according to FIG. 1 is also provided with a window 65, in which the symbols of the group shifting L, S, and R, provided on shaft 55 of support plate 51, are visible during the rotation of said shifting knob.

In the top view of the gearshift console 2 according to FIG. 4, the manual gearshift lever 3—inner tube 31 and outer tube 32—is in the neutral position. The shifting gate H with the shifting paths of the gears G1/G2 and G3/G4 is recognizable in the gate plate 21. The guide webs associated with the gears are designated by 22; pawl 33 is fastened to the outer tube.

FIG. 5 shows said housing 6 with the cams 64, as well as the straight pin 61 arranged in the housing and the locking disk 71 with the holes 73, which is rigidly attached to the inner tube 31 via nut 34. Opening 72 of the locking disk 71 cooperates with said straight pin 61 and limits the rotary movement of housing 6, the housing being shown in the middle position. The threaded holes in which said support plate 51 is fastened via screws 56 are designated by reference numeral 74.

FIGS. 6 and 7 each show one section through housing 6, so that the microswitches 5, which are fastened to the support plate, e.g., via rivets 57, are recognizable in a top view. The support plate itself is held in place on the locking disk 71 with screws 56. Each microswitch, which is designed as a double-interrupting change-over contact, has four solder lugs 58, 59 for connecting the electrical conductors 54. In FIG. 6, the housing is shown in the middle position, with the balls 53 not pressed in, so that the two microswitches 5 are in the noncontacted position, in which the terminals—solder lug 58—are bridged over and the terminals—solder lug 59—are interrupted. FIG. 7 shows a position of housing 6 which was rotated via shifting knob 4 (not shown). In this position, cam 64 of housing 6 has actuated microswitch 50 via ball 530, so that the terminals —solder lug 59—are now bridged over. Balls 53, 530 are held in the area of the pusher 500 of microswitch 5 via the supports 52, Which are molded on support plate 51. In the electrical functional diagram according to FIG. 8, the microswitches are designated by reference numeral 5 and the solenoid valves associated with the groups by 8, 81, and 82. Table 9 shows which of the pushers 500A, 500B, associated with the groups R, L, S, is pressed in.

Gearshift console 2 operates as follows, in conjunction with gearshift lever 3: In the neutral position N of gearshift lever 3 as shown in FIG. 1, pawls 33 are not hindered, so that knob 4 can be rotated both to the left and to the right from the middle position together with the housing 6 and the outer tube 32. The angle of rotation is blocked via balls 62 and holes 73, which are usually provided in duplicate, and limited by opening 72—FIG. 5—in conjunction with straight pin 61. If a gear has been selected, i.e., gearshift lever 3 has been moved until outer tube 32 comes into contact with one of the stops 26 or 27 of gate plate 21, the gearshift lever can no longer be rotated, because pawls 33 are prevented from rotating by guide webs 22. In the middle position of the shifting knob—low-speed group L has been selected—rotation of the gearshift lever 3 and consequently group shifting are prevented, if one of the gears G1 through G4 has been selected, via both pawls 330, in conjunction with the corresponding guide web 220. If gearshift lever 3 has been rotated to the left or right in the neutral position N, in which no gear G1 through G4 of the basic transmission has consequently been selected, the direction of rotation toward the center is blocked by only one pawl 33 in conjunction with a guide web, while the outwardly directed blocking is performed via straight pin 61 in said housing 6 in conjunction with opening 72 of said locking plate. As is clearly apparent from FIGS. 8 and 9, the solenoid valve of the low-speed group 8 is energized via the noncontacted microswitch 5 in the middle position of shifting knob 4, while in the swiveled position, either the solenoid valve of the reverse group 82 is energized via pusher 500A pushed in, or the solenoid valve of the high-speed group 81 is energized via pusher 500B.

I claim:

1. A gearshift console for shifting a gearbox of a group design, comprising:
   at least one gearshift lever;
   a basic transmission controlled through said lever having a set of four gear position G1 through G4 shiftable manually and mechanically in an H pattern and also shiftable in two forward drive groups and one reverse drive group;
   a shifting knob attached to an upper end of said gearshift lever, said knob being rotatable into three shifting positions and being blocked in a gear selected in said basic transmission; and
   an electrical circuit set of components shifting with power assist said three drive groups said electrical circuit set secured in a housing below said shifting knob on said lever.

2. The gearshift console according to claim 1, wherein said gearshift lever comprises:
   an inner tube which can be swivelled into said four gear positions G1 through G4 but is otherwise stationary;
   an outer tube connected to and rotatable together with said shifting knob and swivelled together with said inner tube;
   a gate plate receiving a lower end of said gearshift lever;
   a set of guide webs arranged on said gate plate; and
   at least one pawl connected to said outer tube and cooperating with guide webs in the shifted positions of said basic transmission.

3. The gearshift console according to claim 2 further comprising:
   a blocking mechanism arranged at least partially between said inner tube and said outer tube, said mechanism comprising:
   said housing rigidly connected to said outer tube;
   a locking plate arranged in said housing coaxially with and rigidly connected to said inner tube and formed with an opening;
   at least one ball contactable with said locking plate;
   a pressure spring applying force to said ball; and
   a straight pin limiting rotation of said shifting knob in two forward drive positions of said forward drive groups from deviating to left and right from a middle position said straight pin secured in a lower portion of said housing.

4. The gearshift console according to claim 3, wherein a pair of said pawls and at least one of said guide webs are arranged in each of a shifting direction G1+G3 and G2+G4 of said gear positions, said at least one guide web being at least partially defined by a set of two sides, each of said guide webs being associated with one of said shifting directions, and said pawls being swivelled along both of said sides of one of said guide webs and along a shifting path in said middle position of said shifting knob when a gear is selected, so that said shifting knob cannot be turned out of said middle position, and one pawl is swivelled along a second guide web and rotation into said middle position is prevented in said two rotated positions, while a second direction of rotation is limited by rotation range of said straight pin and said opening, so that group shifting brought about by rotating said shifting knob is possible only in a neutral position of said gearshift lever.

5. The gearshift console according to claim 3, further comprising:
   cams formed on walls of said housing;
   a support plate fastened to said locking plate;
   a set of supports formed on said support plate;
   a ball held within each of the supports;
   two microswitches arranged on said support plate and actuated via said balls and cams; and
   at least one conductor attached to said microswitches and being led through said inner tube.

6. The gearshift console according to claim 5, further comprising:
   a plurality of solenoid valves, one of said valves being associated with one of said gear groups actuated in said middle position via said two microswitches, another two of said solenoid valves, one of each associated with a respective one of said drive groups, being actuated by one microswitch each via said cams molded in one piece on an inside of each end position of the rotation of said housing.

7. The gearshift console according to claim 6, wherein said housing includes a window and said support plate includes a shaft, said shaft being provided with symbols associated with said three shifting positions, said symbols being visible through said window and corresponding to said rotation of said housing via said shifting knob.

8. The gearshift console according to claim 7, further comprising a cover arranged between said shifting knob and said housing, said cover being connected to said shifting knob and fastened to said housing via bolts spaced along a circumference of said housing, and said cover being removable for checking and adjustment of elements within said housing without interfering with any functioning of said elements.

9. The gearshift console according to claim 8, further comprising:
   a joint arranged at said lower end of said gearshift lever, said joint being connected to said inner tube;
   at least one rod lever connected to said joint and functionally transmitting swivel movement from said inner tube; and
   a plurality of bearing bushes between said outer and inner tubes.

10. The gearshift console according to claim 9, wherein said gate plate is arranged in a curved shape around a centerpoint of said joint.

* * * * *